United States Patent
Saito

[11] 4,385,817
[45] May 31, 1983

[54] FOCUSING DETECTING DEVICE

[75] Inventor: Takeo Saito, Shikawatashi, Japan

[73] Assignee: Seiko Koki Kabushiki Kaisha, Tokyo, Japan

[21] Appl. No.: 196,118

[22] Filed: Oct. 10, 1980

[30] Foreign Application Priority Data

Nov. 27, 1979 [JP] Japan ................. 54-153177

[51] Int. Cl.$^3$ .............................................. G03B 7/08
[52] U.S. Cl. ......................................... 354/25; 354/31
[58] Field of Search ................ 354/25 A, 25 P, 31 F

[56] References Cited

U.S. PATENT DOCUMENTS

| | | | |
|---|---|---|---|
| Re. 27,461 | 8/1972 | Harvey | 354/25 A |
| 3,435,744 | 4/1969 | Stimson | 354/25 A |
| 3,442,193 | 5/1969 | Pagel | 354/25 A |
| 3,443,502 | 5/1969 | Harvey | 354/25 A |
| 4,085,320 | 4/1978 | Wilwerding | 250/201 |
| 4,123,650 | 10/1978 | Hosoe et al. | 354/25 A |
| 4,255,029 | 3/1981 | Freudenschuss | 354/25 A |
| 4,257,705 | 3/1981 | Hosoe et al. | 354/25 A |
| 4,284,335 | 8/1981 | Takemae et al. | 354/25 |

FOREIGN PATENT DOCUMENTS 54-128363 10/1979 Japan .

*Primary Examiner*—Russell E. Adams
*Attorney, Agent, or Firm*—Robert E. Burns; Emmanuel J. Lobato; Bruce L. Adams

[57] ABSTRACT

An illuminating system is provided for a focus detecting device capable of producing range detection signals corresponding to the distance between the camera and the objects by receiving with a plurality of photoelectric elements the light of the objects transmitted through a fixed light passage and a movable light passage provided with a movable mirror.

The illuminating light source of the illuminating system is disposed to project the illuminating light through the movable light passage. When the brightness of the objects is low, the plurality of photoelectric elements are integrated into practically a single photoelectric element to combine the outputs of respective photoelectric elements into a single output thus receiving the reflected light of the illumination and providing a focus detection signal.

6 Claims, 5 Drawing Figures

4,385,817

FOCUSING DETECTING DEVICE

BACKGROUND OF THE INVENTION

This invention relates to a focus detecting device capable of providing range detection signals corresponding to the distances between the camera and objects by utilizing the principle of the coincident type range finder. More particularly, it concerns a focus detecting device effective even when the brightness of the objects is insufficient.

There has been proposed a focus detecting device which provides a range detection signal by photoelectrically detecting the coincidence of images transmitted through a fixed light passage and a movable light passage by employing the principle of the coincidence type range finder.

An illuminating method combined with the described focus detecting device also has been proposed for additionally illuminating objects by an illuminating means, such as a lamp, when the photoelectric current of the photoelectric elements reduces due to insufficient brightness of the object being photographed.

However, the conventional illuminating light source for additionally illuminating the object when the brightness of the object is insufficient, requires a large amount of energy to secure the effective function of the individual photoelectric elements and consumes a large quantity of electricity because the light receiving area of the photoelectric elements is fixed. Further, the conventional illuminating system requires an additional space as the optical systems of the illuminating system and the range detecting system are separately provided and consumes wasteful electricity as the illuminating system illuminates useless area other than the object area.

SUMMARY OF THE INVENTION

The present invention has a number of advantages over these prior art focus detecting devices. According to the present invention, the light receiving area of the photoelectric elements is virtually increased to provide sufficient electric current when the brightness of the object is insufficient so that focus detection is possible with an illuminating source of a small light energy capacity. In a focus detecting device capable of producing range detection signals corresponding to the distances between objects and the camera by receiving in conjunction with a plurality of photoelectric elements the incident light from an object transmitted through a fixed light passage and a movable light passage, an illuminating system is adapted to project the illuminating light through the movable light passage and the plurality of photoelectric elements are integrated into a single photoelectric element by the output of a brightness detecting circuit when the brightness of an object is insufficient for focus detecting operation thus receiving the reflection of the illuminating light with the integrated photoelectric elements and producing a range detection signal.

DETAILED DESCRIPTION OF THE PREFERRED EMBODIMENTS

Figure 1:
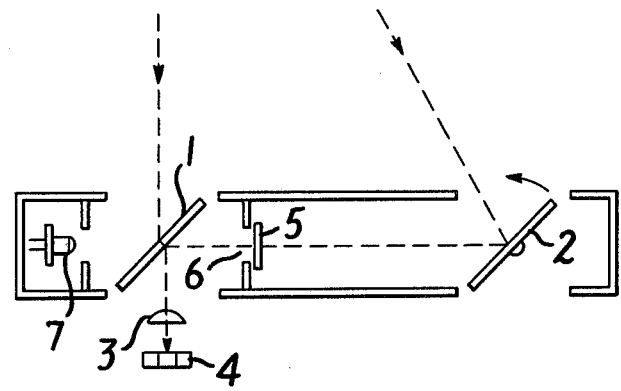
FIG. 1 is a schematic illustration of an optical system embodied according to the present invention.

FIG. 1 is a schematic illustration of an optical system of the present invention. A half mirror 1 is disposed in a fixed light passage. The incident light from an object to be photographed is transmitted to a photoelectric unit 4 through the half mirror 1 and a condenser lens 3. The photoelectric unit 4 is comprised of a plurality of separate photoelectric elements arranged in an array. A silicon photocell is preferred for the photoelectric elements. A movable mirror 2 provided within a movable light passage is adapted to start turning in the direction of the arrow in conjunction with the start of the range finding operation. A sector 5 is turned by a means, not shown, interlocking with the range finding operation so that the light incident on the movable mirror 2 passes through an aperture 6, is reflected by the half mirror 1, then transmitted to the photoelectric unit 4 through the condenser lens 3. An illuminating element 7 for projecting light is disposed on the left side of the half mirror 1 as shown in FIG. 1. An approximate infrared emission diode, visible ray emission diode or a normal illuminating light may be used as the illuminating element 7. The illuminating element 7 is connected to a circuit shown in FIG. 2 and controlled so as to illuminate when the brightness of the object is insufficient.

Figure 2:
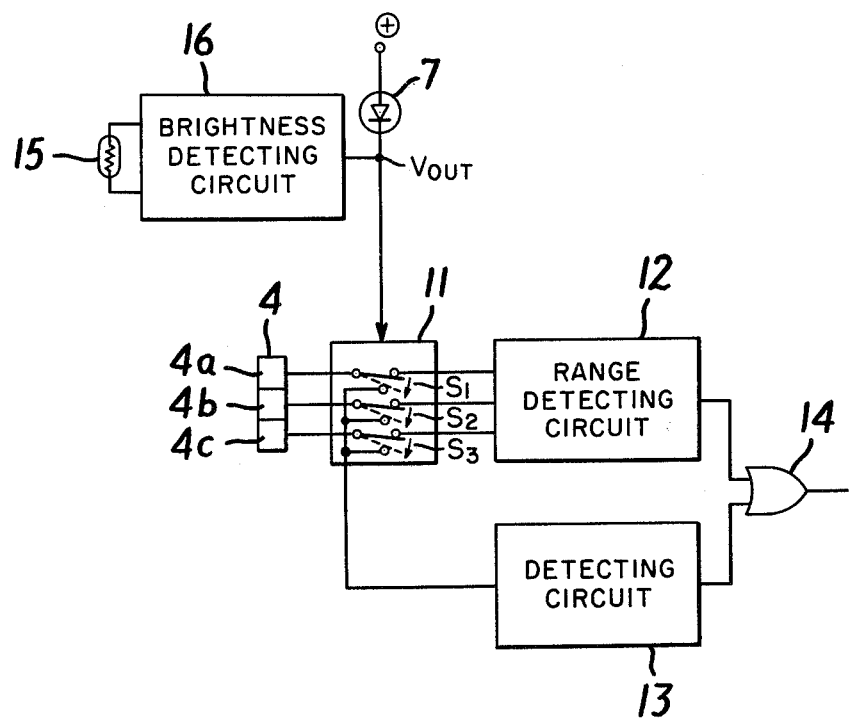
FIG. 2 is a diagrammatic illustration of a circuit for providing a range detection signal using the signals provided by the optical system of FIG. 1.

FIG. 2 is a diagrammatic illustration of a circuit which produces a range detection signal using information provided by the optical system of FIG. 1. In FIG. 2, the reference numeral 4 designates the photoelectric unit 4 of FIG. 1. The photoelectric unit 4 consists of three photoelectric elements 4a, 4b and 4c. A switching circuit 11 is set as shown in FIG. 2 in the normal condition to send the output of the photoelectric elements 4a, 4b and 4c to a range detecting circuit 12. When the output of a brightness detecting circuit 16 is in the "L" level, the switches S1, S2 and S3 are switched as shown by dotted lines. The switches S1, S2 and S3 are electronic switches, i.e., analog semiconductor switches or the like. The range detecting circuit 12 used in carrying out the present invention may, for example, be of the types described in U.S. patent application Ser. No. 961,742 which corresponds to Japanese patent application No. 138740/77. A detecting circuit 13 detects the illuminating light. One embodiment of the range detecting cirzit 12 will be described hereinafter with reference to FIG. 5. An OR circuit 14 provides a range detection signal when the output signals of the range detecting circuit 12 and the detecting circuit 13 are received. An object brightness detector 15 is formed of a photoconductive element, such as CdS. An object brightness detecting circuit 16 provides at the output Vout an "H" level signal or "L" level signal when the brightness of the object is high or low, respectively.

The illuminating element 7 is connected to the output terminal Vout of the object brightness detecting circuit 16 as shown in FIG. 2 and adapted to illuminate only when the "L" level signal is provided at the terminal Vout.

The operation of the device will be explained referring to FIGS. 1 and 2. When the brightness of an object to be photographed is at the normal level, the object brightness detecting circuit 16 provides a brightness detection signal in the form of an "H" level signal at Vout so that the illuminating element does not illuminate.

The light from the object is sent to the photoelectric unit 4 through the half mirror 1. The outputs of the respective photoelectric elements 4a, 4b and 4c are sent to the range detecting circuit 12 through the corresponding switches S1, S2 and S3 of the switching circuit 11, then the ratios of the outputs of the photoelectric elements, for instance 4a and 4c, to the output of a reference photoelectric element, for instance 4b, are computed and the results are memorized.

At the start of the range finding operation, the sector 5 is retracted from the movable light passage and the movable mirror 2 starts turning, therefore, the photoelectric unit 4 receives a light information composed of a light information through the fixed light passage and the half mirror 1 and a light information through the movable light passage. The outputs provided by the photoelectric elements 4a, 4b and 4c are sent to the range detecting circuit 12 through the switching circuit 11 and the ratios of the outputs of the photoelectric elements to the output of the reference photoelectric element are computed and compared with the previously computed and memorized values. When the corresponding ratios are in agreement, a range detection signal is provided and sent to known range setting device through the OR circuit for controlling the position of the taking lens of a camera.

When the brightness of the object is insufficient, the object brightness detecting circuit 16 provides a "L" level signal so that the illuminating element 7 is energized and the switches S1, S2 and S3 of the switching circuit 11 are switched to the positions shown by dotted lines. Consequently, the detecting circuit 13 receives a composite signal from the photoelectric elements 4a, 4b and 4c. The range detecting circuit 12 becomes ineffective as the input signal is cut due to switching of the circuit 11. The illuminating light emitted by the illuminating element 7 is reflected by the half mirror 1, projected against and reflected by the object being photographed to the photoelectric unit 4 through the half mirror 1. The output of the photoelectric unit 4 is sent to the detecting circuit 13 through the switching circuit 11 and memorized.

Coincident with the start of the range finding operation, the sector 5 is retracted from the movable light passage allowing the illuminating light emitted by the illuminating element 7 to reach the object through the movable light passage passing through the half mirror 1, the aperture 6 and being reflected by the movable mirror 2.

When the movable mirror 2 is turned to a position corresponding to the object distance, the illuminating light emitted by the illuminating element 7 and reflected by the movable mirror 2 is exactly projected against the object and the illuminating light reflected by the object is returned along the movable light passage, reflected by the half mirror 1 and sent to the photoelectric unit 4. Thus the photoelectric unit 4 receives the illuminating light reflected by the object and transmitted through the movable light passage in addition to the illuminating light previously sent to the photoelectric unit 4 through the fixed light passage. The detecting circuit 13 detects the differential of the quantity of light between before and after the start of the range finding operation and provides an output signal through the OR circuit 14. Thus the detection of the illuminating light is facilitated by the increased light receiving area of the photoelectric unit 4 as the photoelectric elements are integrated virtually in a single photoelectric element when the brightness of the object is insufficient.

Although the invention has been described without referring to the object field light other than the illuminating light, in practice, it is impossible to discriminate the illuminating light from the object field light as objects are illuminated by the field light.

Figure 3:
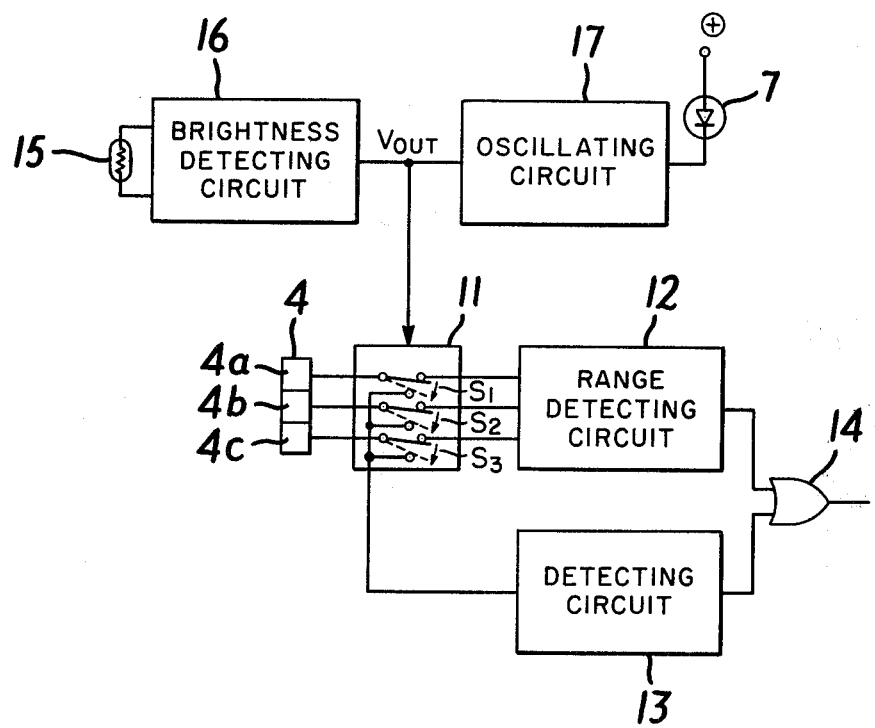
FIG. 3 is a diagrammatic illustration of another embodiment of a circuit for providing a range detection signal.

The embodiment as shown by FIG. 3 is developed to cope with the aforementioned difficulty. In FIGS. 2 and 3, like reference numerals designate like or corresponding components. In the embodiment of FIG. 3, an oscillating circuit 17 is connected to the output side of the object brightness detecting circuit 16 and the illuminating element 7 is connected to the output side of the oscillating circuit 17.

The action of the embodiment of FIG. 3 will be explained.

When the brightness of the object being photographed is insufficient and the output of Vout is in the "L" level, the oscillating circuit 17 is energized and the illuminating element 7 flickers at a fixed frequency, therefore, discriminative detection of the illuminating light by the detecting circuit 13 is facilitated.

Figure 4:
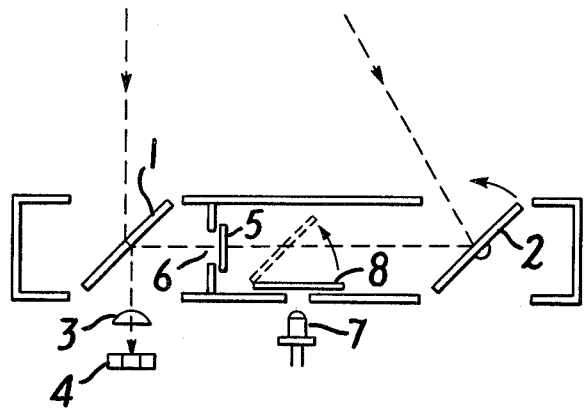
FIG. 4 is a schematic illustration of another optical system of the present invention.

In the embodiment of FIG. 4, the illuminating element 7 is disposed between the half mirror 1 and the movable mirror 2. Like reference numerals designate like or corresponding components in FIGS. 1 and 4.

Normally, a reflecting mirror 8 is stored at the position as shown by continuous lines without interfering with the light passage between the movable mirror 2 and the half mirror 1.

When the brightness of the object is insufficient, the illuminating element 7 is actuated while the reflecting mirror is raised to the position as shown by dotted lines.

Accordingly, the illuminating light emitted from the illuminating element 7 is reflected by the reflecting mirror 8 and the movable mirror 2. The illuminating light is exactly projected against the object and reflected to the photoelectric unit 4 when the movable mirror 2 is turned to a position corresponding to the object distance.

Figure 5:
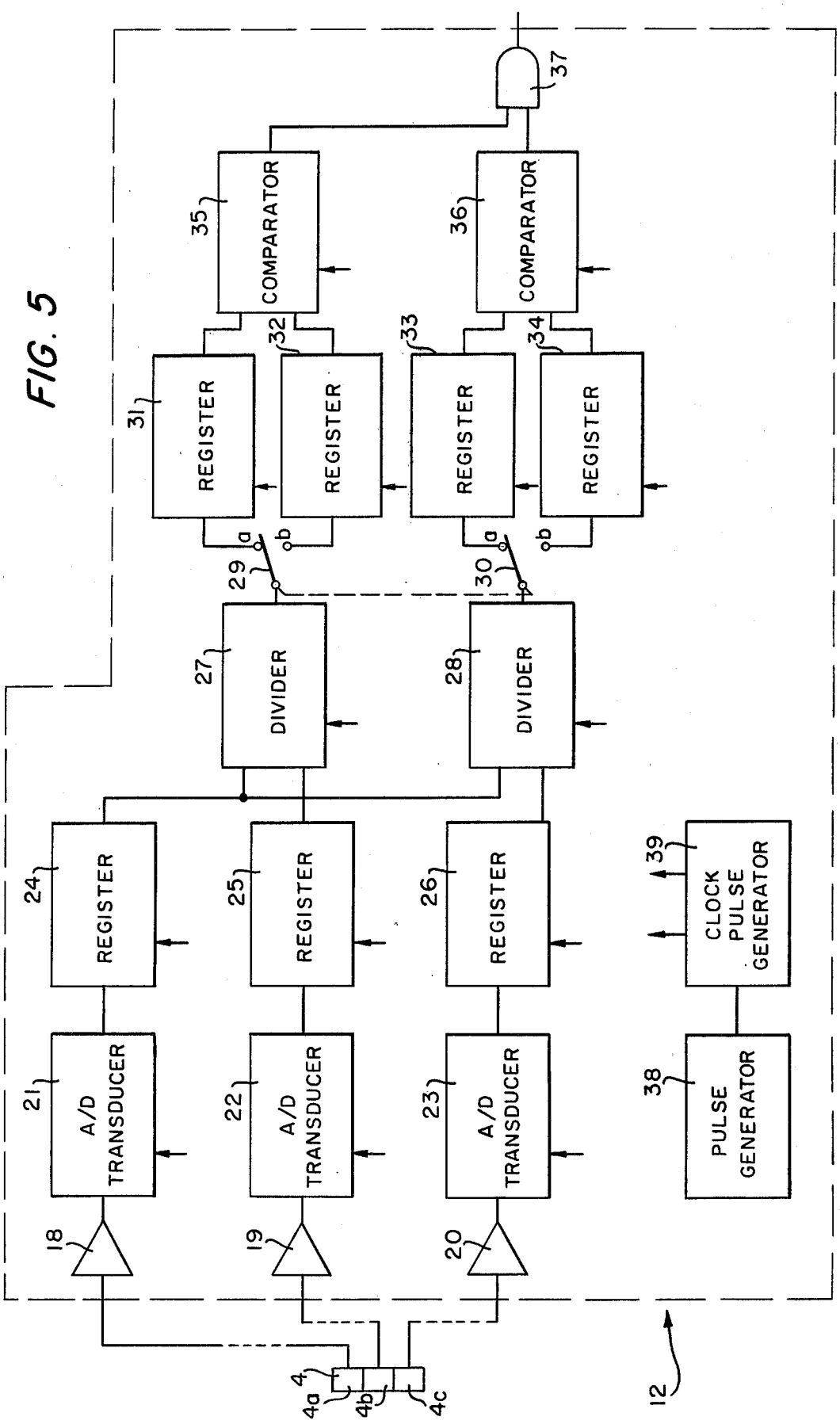
FIG. 5 is a block diagram of a range detecting circuit.

FIG. 5 shows in block form an embodiment of the range detecting circuit 12 used in the embodiments shown in FIGS. 2 and 3. The range detecting circuit 12 comprises a plurality of amplifiers 18, 19 and 20 connected to receive and amplify the outputs from respective ones of the photoelectric elements 4a, 4b and 4c of the photoelectric unit 4. Analog-to-digital transducers 21, 22 and 23 are connected to the amplifiers for converting the amplified analog outputs to corresponding digital values which are transmitted to registers 24, 25 and 26. A divider 27 is connected to receive the outputs from the registers 24 and 25, and a divider 28 is connected to receive the outputs from the registers 24 and 26. A change-over switching means 29,30 simultaneously switches the outputs of the dividers 27 and 28 to either terminals "a" or terminals "b" which are connected respectively to the input side of registers 31 and 33 and registers 32 and 34. The outputs of the registers 31 and 32 are fed to a comparator 35 and the outputs of the registers 33 and 34 are fed to a comparator 36, and the outputs from the two comparators are fed to an AND gate circuit 37. A pulse generator 38 is connected to a clock pulse generator 39 which applies clock pulses to the various circuit blocks, as indicated by the arrow inputs applied to each circuit block, for controlling the timing sequence of operation of the circuitry.

The operation of the range detecting circuit 12 shown in FIG. 5 will now be described with reference to FIGS. 1 and 2. Assuming that the brightness of the object to be photographed is above a predetermined level, the brightness detecting circuit 16 provides an "H" level signal at the terminal Vout whereupon the switching circuit 11 is placed in the switching state indicated by solid lines so that the outputs of the photoelectric elements 4a, 4b and 4c are individually applied to the range detecting circuit 12. When the light from the object is transmitted along the fixed light passage through the half mirror 1 to the photoelectric unit 4, the outputs of the photoelectric elements 4a, 4b and 4c are applied to and amplified by the amplifiers 18, 19 and 20, the amplified outputs are converted into corresponding digital values which are stored in the registers 24, 25 and 26, and then the ratios of the outputs of the photoelectric elements are computed and the results memorized. The determination of the ratios is carried out by the dividers 27 and 28 and in the disclosed embodiment, the divider 27 divides the digital value output of the photoelectric element 4a stored in the register 24 by that of the photoelectric element 4b stored in the register 25 and the divider 28 divides the digital value output of the photoelectric element 4a stored in the register 24 by that of the photoelectric element 4c stored in the register 26. The resulting ratio signals are stored in the registers 31 and 33 via the change-over switching means 29,30 which at this time is switched to the terminals "a" as shown in FIG. 5.

At the start of the range finding operation, the sector 5 is retracted from the movable light passage and when the movable mirror 2 begins turning, the photoelectric unit 4 receives incident light from both the fixed light passage in which the light is transmitted through the half mirror 1 and the movable light passage in which the light is reflected by the movable mirror 2 and by the half mirror 1. In this manner, the photoelectric elements 4a, 4b and 4c receive light information from both the fixed and movable light passages and the outputs are amplified, converted into digital values and suitably processed to determine the ratios of the output of the photoelectric element 4a with respect to the outputs of both the photoelectric elements 4b and 4c. During the range finding operation, the change-over switching means 29,30 is switched to the terminals "b" so that as the ratio signals are periodically developed in synchronism with the turning of the movable mirror 2, the ratio signals are applied to the registers 32 and 34. The ratio signal stored in the register 31 is compared by the comparator 35 with the ratio signals periodically applied to the register 32 and in like manner, the ratio signal stored in the register 33 is compared by the comparator 36 with the ratio signals periodically applied to the register 34 and when a favorable comparison is simultaneously reached in both comparators, an output range detection signal is produced from the AND gate circuit 37.

In the embodiment of FIG. 1, illuminating light of a fixed level is provided for the photoelectric unit 4 prior to the operation of the movable mirror 2, whereas, in the embodiment of FIG. 4, no illuminating light is provided for the photoelectric unit 4 prior to the operation of the movable mirror 2, therefore, the detection of the illuminating light is facilitated.

Although the invention has been described in its preferred forms with three photoelectric elements, it is obvious that the number of photoelectric elements is not limited to three.

It will be well understood from what has been described that according to the present invention, objects are illuminated by an illuminating means and the outputs of a plurality of photoelectric elements are integrated into a single composite output signal to provide an increased sensitivity when the brightness of the object is insufficient, therefore, the detection of the illuminating light is facilitated, wasteful illumination of the object is eliminated as the illuminating light is transmitted through the optical passages of the coincidence type range finder and a reduced electric current is required for the illumination.

What is claimed is:

1. A focus detecting device, capable of providing range detection signals corresponding to distances between the camera and objects by receiving with a plurality of photoelectric elements the incident from objects transmitted through a fixed light passage and a movable light passage having a movable mirror, comprising an illuminating system adapted to project light through said movable light passage, and a brightness detecting circuit which provides a signal to integrate said plurality of photoelectric elements into a single photoelectric element when the brightness of an object is insufficient thus receiving the reflected light of the illumination with said photoelectric elements and producing a range detection signal.

2. In a focus detecting device for use in a camera having fixed and movable light paths along which light travels from an object to be photographed to an array of photoelectric elements each of which produces an electric output signal proportional to the intensity of light incident thereon: brightness detecting means for detecting the brightness of the object to be photographed; illuminating means for illuminating the object with light when the brightness detecting means detects that the object brightness is below a certain level; and circuit means operative in one mode when the detected object brightness is above said certain level for individually processing the electric output signals from each of the photoelectric elements and producing therefrom a range detection signal corresponding to the distance between the camera and the object and operative in another mode when the detected object brightness is below said certain level for integrating the electric output signals from at least some of the array of photoelectric elements into a composite output signal and producing therefrom a range detection signal corresponding to the distance between the camera and the object.

3. A focus detecting device according to claim 2; wherein the illuminating means includes means for projecting light along the movable light path to illuminate the object.

4. A focus detecting device according to claim 2 or claim 3; wherein the circuit means includes switching means for simultaneously switching the electric output signals from at least some of the array of photoelectric elements to a common output terminal to thereby integrate the switched signals into a composite output signal.

5. A focus detecting device according to claim 2 or claim 3; wherein the brightness detecting means includes means for developing an electric brightness signal having a magnitude proportional to the brightness of the object to be photographed; and wherein the circuit means comprises means responsive to the electric brightness signal for placing the circuit means in said one mode when the electric brightness signal is above a given level and for placing the circuit means in said another mode when the electric brightness signal is not above said given level.

6. A focus detecting device according to claim 5; wherein the illuminating means includes means responsive to the electric brightness signal whenever the signal is not above said given level for illuminating the object.

* * * * *